(12) United States Patent
McGirr

(10) Patent No.: US 6,763,306 B2
(45) Date of Patent: Jul. 13, 2004

(54) METHOD OF USING OCEAN ACOUSTIC SENSORS FOR COASTAL EARTHQUAKE PREDICTION

(75) Inventor: Scott C. McGirr, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 10/298,714

(22) Filed: Nov. 18, 2002

(65) Prior Publication Data
US 2004/0098198 A1 May 20, 2004

(51) Int. Cl.⁷ .............................................. G01V 1/28
(52) U.S. Cl. ................................................ 702/15
(58) Field of Search ................... 702/14, 15; 706/929; 340/690

(56) References Cited

U.S. PATENT DOCUMENTS 4,193,393 A * 3/1980 Schlager ..................... 600/523
4,989,611 A * 2/1991 Zanetti et al. ............... 600/508
6,522,996 B1 * 2/2003 Groutage ..................... 702/196

OTHER PUBLICATIONS

Mrty, T. "The Dynamics Of Tsunamis", OCEANS, Sep. 1975, vol. 7, pp. 515–522.*

* cited by examiner

Primary Examiner—Donald McElheny, Jr.
(74) Attorney, Agent, or Firm—Celia C. Dunham; Michael A. Kagan; Peter A. Lipovsky

(57) ABSTRACT

A method of predicting impending coastal seismic activity by using ocean-based acoustic sensors. Acoustic sensors are used to sense and record low frequency acoustic events, including primary and tertiary waves. Characteristics that may be sensed and recorded include frequency, amplitude, and duration of the acoustic events. More specifically, the occurrence of T-waves over a selected time period are sensed and recorded. A decrease in the rate of the occurrence of T-waves during a portion of the selected time period is an indication of impending seismic activity.

6 Claims, 8 Drawing Sheets

| SEISMIC | BEFORE EARTHQUAKE | | AFTER EARTHQUAKE | |
|---|---|---|---|---|
| | MEAN | STD D | MEAN | STD D |
| MAGNITUDE (M) | 1.82 | 2.05 | 4.26 | 5.39 |
| DEPTH (KM) | 7.26 | 4.78 | 5.94 | 4.78 |
| LOG E/HR (ERGS) | 14.74 | | 20.31 | |
| INTERVAL | EVENTS | HOURS | EVENTS | HOURS |
| | 150 | 64.52 | 423 | 15.48 |
| | DATE | TIME | DATE | TIME |
| START | 94/01/14 | 20:00 | 94/01/17 | 12:30 |
| END | 94/01/17 | 12:30 | 94/01/18 | 4:00 |

FIG. 3

| ACOUSTIC | BEFORE EARTHQUAKE | | | | AFTER EARTHQUAKE | | | | | |
|---|---|---|---|---|---|---|---|---|---|---|
| | T-WAVE | | T-WAVE | | T-WAVE | | | P-WAVE | | |
| | MEAN | STD D | MEAN | STD D | MEAN | STD D | | MEAN | STD D | |
| AMPLITUDE LOG | 3.29 | 3.18 | 3.01 | 2.68 | 2.96 | 2.75 | | 3.44 | 3.77 | |
| DURATION (SEC) | 135.8 | 73.1 | 91.2 | 53.8 | 68.3 | 46.1 | | 94.7 | 85.1 | |
| LOG E/HR (ERGS) | 19.54 | | 17.23 | | 18.07 | | | 19.80 | | |
| | EVENTS | HOURS | EVENTS | HOURS | EVENTS | HOURS | | EVENTS | HOURS | |
| INTERVAL | 175 | 33.0 | 5 | 31.3 | 30 | 14.9 | | 71 | 14.9 | |
| | DATE | TIME | DATE | TIME | DATE | TIME | | DATE | TIME | |
| DATA START | 94/01/14 | 20:12 | 94/01/16 | 5:11 | 94/01/17 | 12:31 | | 94/01/17 | 12:31 | |
| DATA END | 94/01/16 | 5:11 | 94/01/17 | 12:31 | 94/01/18 | 3:25 | | 94/01/18 | 3:25 | |

FIG. 6

METHOD OF USING OCEAN ACOUSTIC SENSORS FOR COASTAL EARTHQUAKE PREDICTION

BACKGROUND OF THE INVENTION

This invention relates to methods of predicting the occurrence of seismic events. More specifically, this invention relates to a method of predicting coastal earthquakes by using ocean acoustic sensors. The coastal area can extend several hundred kilometers inland.

Ocean-based acoustic sensors have been used to study ocean explosions, volcanic eruptions, and earthquakes. Acoustic sensors have been found to be more sensitive than seismic sensors for detection of earth tremors. Acoustic sensors can distinguish three seismic waves, named in accordance with observed transmission speeds through water. Primary waves (P-waves) are caused by longitudinal compression forces and can travel through both solids and liquids. P-Wave acoustic and seismic signals are correlated. Secondary waves (S-waves) are caused by transverse shearing forces and can travel only through elastic rock. S-waves can only be observed indirectly by acoustic sensors when vertical motion is converted to acoustic energy near bottom-mounted sensors. Tertiary waves (T-waves) are caused by the release of sound energy resulting from seismic activity into water. T-waves are rapidly attenuated in land but can travel long distances by horizontal propagation in water. Due to variations in signal amplitude with ocean, depth and topography, signal duration has been shown to be a more reliable indicator of seismic strength.

Seismically active belts exist along coastal areas surrounding the Pacific basin that otherwise shows relative calm, with the exception of a few island groups such as Hawaii. Sources of T-waves have been traced to these seismically active areas and to deep offshore trenches. It is not clear how T-waves are produced, but it is believed that they result from a seismic-to-acoustic coupling on the seafloor. For continental earthquakes, T-waves can be modeled accurately as individual point sources distributed over the ocean floor. Simulation studies indicate that T-waves are excited most efficiently in shallow water within a few hundred kilometers of an earthquake epicenter. Empirical studies have shown that many small seismic events produce P- and S-waves, but not T-waves.

Today, earthquakes are monitored with land-based seismic sensors that do not facilitate earthquake prediction. Acoustic sensors have been found to detect energy changes several hours prior to an earthquake and can be used for prediction.

SUMMARY OF THE INVENTION

The invention provides a method of predicting impending coastal seismic activity by using ocean-based acoustic sensors. Acoustic sensors are used to sense and record low frequency acoustic P-waves and T-waves associated with seismic activity. Wave characteristics including frequency, amplitude, and duration of the acoustic events are analyzed to determine the strength and rate of occurrence of T-waves. A decrease in the rate of the occurrence of T-waves during a portion of the selected time period is indicative of impending seismic activity. The unique aspect of this invention is the a priori processing of acoustic (vice seismic) data from ocean-based sensors to predict coastal earthquakes. The scope of this invention is not limited to particular signal processing technique, but includes all techniques capable of characterizing T-waves for predictive purposes.

BRIEF DESCRIPTION OF THE DRAWINGS

For a more complete understanding of the method of using ocean acoustic sensors for coastal earthquake prediction, reference is now made to the following detailed description of the embodiments as illustrated in the accompanying drawings wherein:

(c) FIG. 3 is a table summarizing the seismic events before and after the 1994 Northridge earthquake;

(g) FIG. 6 is a table summarizing the acoustic events before and after the 1994 Northridge earthquake; and (h)

DESCRIPTION OF THE EMBODIMENTS

Figure 1:
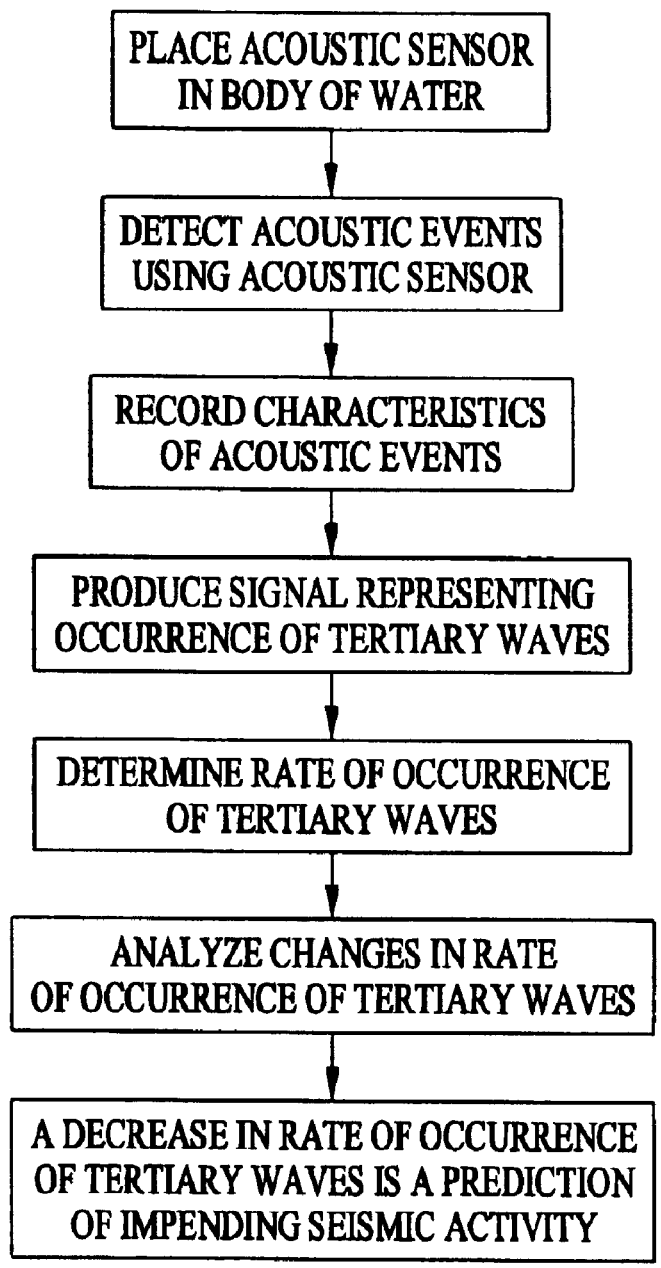
FIG. 1 is a flow chart of a method of using ocean acoustic sensors for predicting coastal earthquakes.

FIG. 1 is a flow chart showing a method of using ocean acoustic sensors for predicting coastal earthquakes. At least one acoustic sensor is located offshore at a suitable distance to detect coastal events. Acoustic events, including P-waves and tertiary waves, are detected by the acoustic sensor. Characteristics including, but not limited to, frequency, amplitude, and duration of the acoustic events are extracted and compiled. More specifically, an acoustic signal is analyzed over a selected period of time to identify T-waves. T-waves are typically characterized by frequencies ranging between about 5–20 Hertz. Then, the rate of occurrence of T-waves over the selected time period is determined. A decrease in the rate of occurrence of T-waves during a portion of the selected time period is indicative of impending seismic activity. Subsequent Figures (FIGS. 2–7) illustrate the application of this method to data from the Northridge, Calif. earthquake on Jan. 17, 1994. Seismically-generated events were analyzed prior to and after the earthquake. The earthquake occurred at 12:31 GMT and had a moment magnitude (Mw) of 6.7 and surface magnitude of 6.6. The epicenter was located at a position of 118.54 W longitude and 34.21 N latitude, at a depth of 18.4 kilometers. The rupture occurred along the Northridge thrust fault and had a rupture area of 300 square kilometers. Shocks were observed over a surface distance that ranged 32 km north-south by 31 km east-west and over a depth ranging from ground level to 23 km. The distance of the shocks from the coastline ranged from 5 to 35 kilometers.

The 1994 Northridge earthquake was selected for study since it occurred in proximity to U.S. Navy underwater acoustic sensors terminated at San Nicolas Island that were recording at the time of the event. These acoustic sensors, used for ocean research in support of the Navy's Sound Surveillance System, recorded both P-wave and T-wave acoustic energy.

For comparison with acoustic data, land seismographic data for an 80-hour time period before and after the 1994

Figure 2:
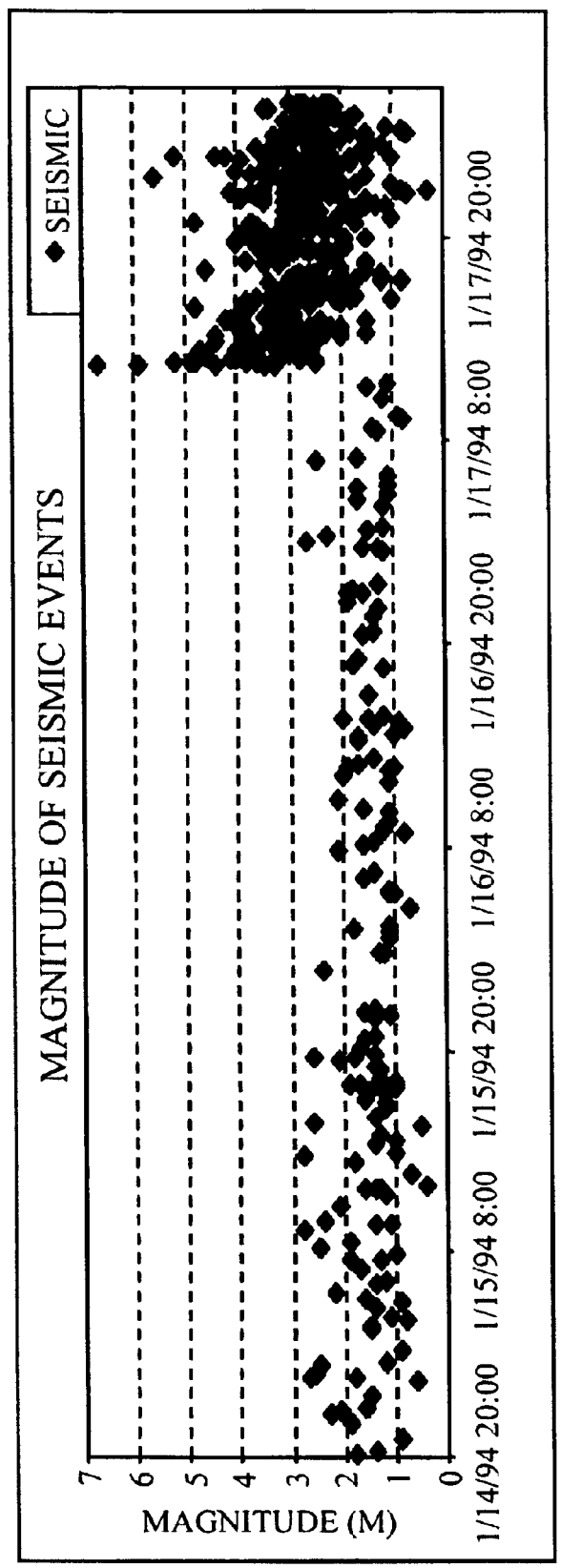
FIG. 2 is a plot of seismic events observed before and after the 1994 Northridge earthquake for an 80-hour time period.

Northridge earthquake, from 20:00 GMT on Jan. 14, 1994 through 03:59 GMT on Jan. 18, 1994, were obtained online from the Southern California Earthquake Data Center (SCEDC). Referring to FIG. 2, the seismic events recorded during the selected 80-hour time period showed increases in both amplitude and rate of occurrence of aftershocks, but no foreshocks or other pattern changes prior to the earthquake were evident. Referring now to the table of FIG. 3, it is shown that, although greater than tenfold increase in both magnitude and rate of occurrence of seismic events occurred after the main shock, no seismic activity changes were apparent prior to the earthquake. The depth of events also changed after the earthquake, with increased activity at 6 km depth and within 3 km of the surface. In this study, a total of 150 shocks were observed over a 64.5-hour period prior to the earthquake and 423 shocks were observed over a 15.5-hour period after the earthquake. Seismic events occurred at an average rate of 2.3 events per hour prior to the earthquake and 27.3 events per hour after the earthquake. The seismic data were converted to a linear scale to calculate means and standard deviations. Energy (E) released in ergs was estimated from seismic magnitude (M) using the empirically derived equation Log E=1.5M+11.4. It should be noted that this approach to estimation of energy might be in error by as much as one log unit.

Figure 4A:
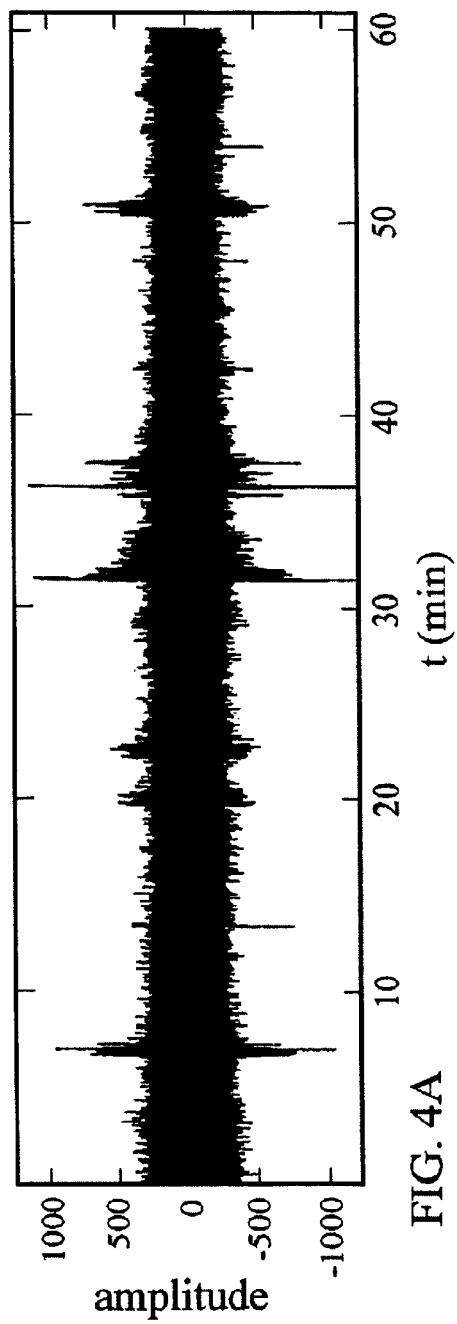
FIG. 4A is an amplitude vs. time plot of the acoustic recordings made on Jan. 17, 1994, from 18:00 to 19:00 GMT, following the 1994 Northridge earthquake.
Figure 4B:
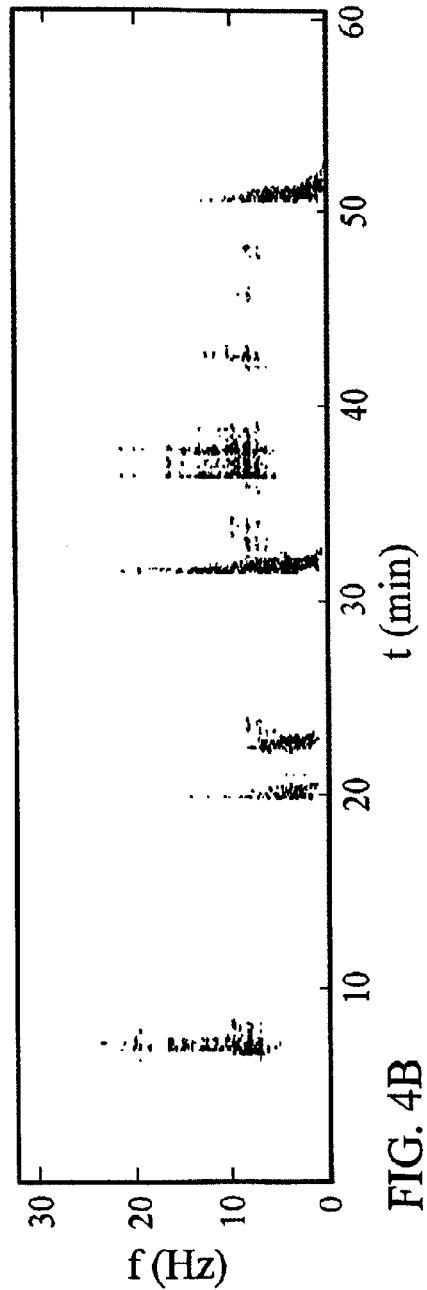
FIG. 4B is a frequency spectrogram of acoustic recordings made on Jan. 17, 1994, from 18:00 to 19:00 GMT, following the 1994 Northridge earthquake.

Acoustic data from the U.S. Navy acoustic sensors, available through Lawrence Livermore Laboratory, were acquired for 80 hours from 20:12 GMT on Jan. 14, 1994 through 03:30 GMT on Jan. 18, 1994. Data from one acoustic sensor was sampled at 200 Hz and processed using signal processing software. The 200 Hz sampling rate provided an effective spectral analysis for frequencies in the range of 0 Hz to 100 Hz. Analog to digital conversion provided 32,768 discrete sound levels (positive and negative), equivalent to a maximum of 4.52 on a logarithmic scale (base 10). The digital levels were converted to log scale to normalize the data for analysis and facilitate comparison to seismic data measured on the Richter scale. FIG. 4A is an amplitude vs. time plot of the acoustic recordings made on Jan. 17, 1994, from 18:00 to 19:00 GMT, following the 1994 Northridge earthquake. FIG. 4B is a frequency spectrogram of the sane acoustic data. As shown in FIG. 4B, the difference between P-waves and T-waves can readily be seen on frequency spectrograms. In general, P-waves range in frequency from near 0 to 15 Hz and T-waves range in frequency from 5 to 20 Hz. The sound amplitude of both types of waves trails off at higher frequencies and can be observed in higher ranges with louder sources or quieter ambient noise backgrounds.

Figure 5:
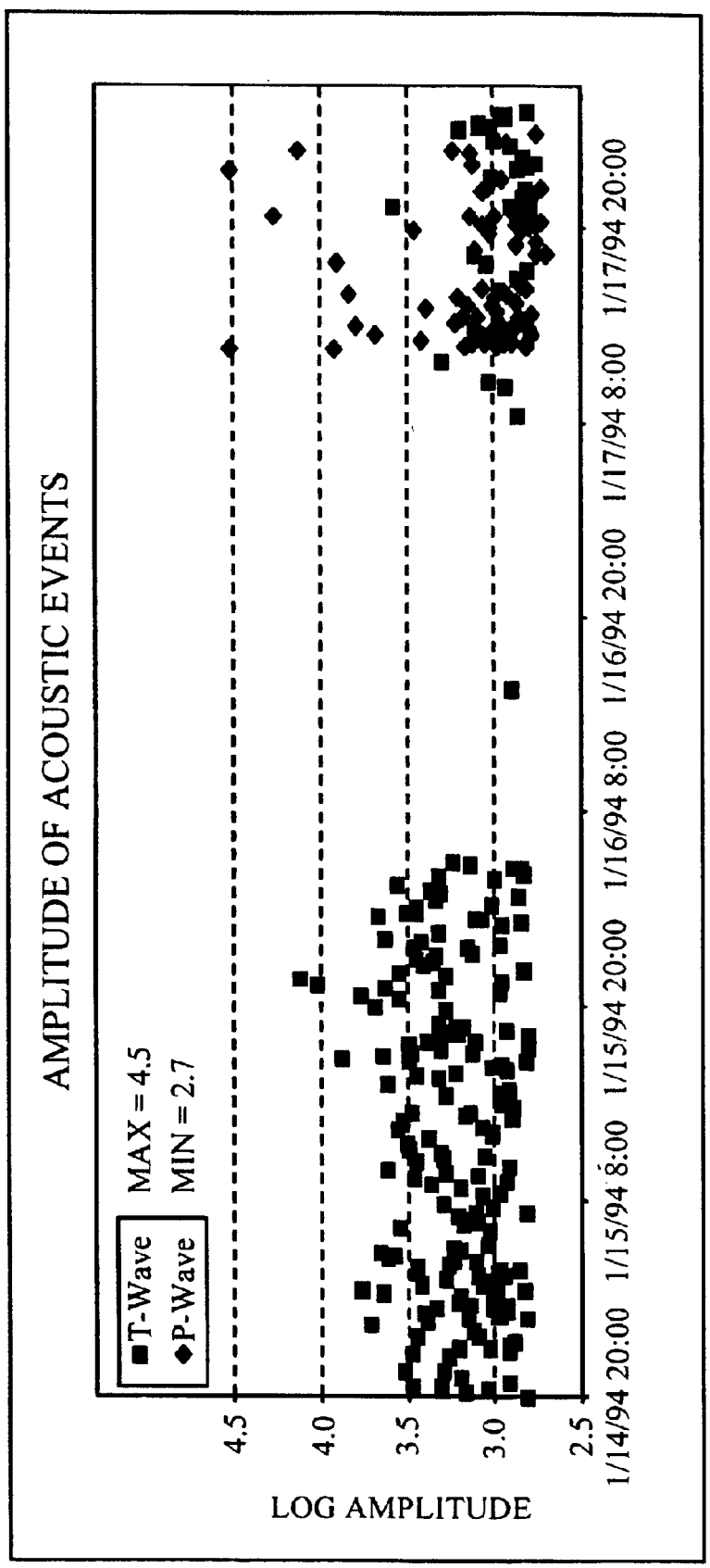
FIG. 5 is a plot of acoustic events observed before and after the 1994 Northridge earthquake for an 80-hour time period.

In FIG. 5, a plot of the acoustic events in the 80-hour time period before and after the 1994 Northridge earthquake shows that there is a marked change in rate of occurrence of T-waves prior to the earthquake. During the recorded period, the T-wave rate of occurrence remained constant for 33 hours, stopped abruptly 31 hours and 20 minutes prior to the earthquake, and gradually resumed activity after the earthquake. The P-waves were observed only during and after the earthquake, reaching sensor threshold values at the time of the earthquake and subsequently tapered off over a period of 16 hours. In this study, acoustic events were included in the analysis only if they registered a background threshold of 500 digital units or equivalently 2.70 on a log scale.

Referring to the table of FIG. 6, the acoustic T-wave data showed no significant changes in amplitude before and after the earthquake, but the data showed changes in the rate of event occurrence. The T-waves showed a distinct change during the time period before the earthquake and were subdivided into three time periods for analysis. The following T-wave occurrences were observed: (1) from 20:12 GMT on Jan. 14, 1994, to 05:11 GMT on Jan. 16, 1994, the rate was 5.30 per hour; (2) from 05:11 GMT on Jan. 16, 1994, to 12:31 GMT on Jan. 17, 1994, the rate decreased to 0.16; and (3) from 12:31 GMT on Jan. 17, 1994, when the earthquake occurred, to 03:25 GMT on Jan. 18, 1994, the rate increased to 2.01. The P-waves were observed at a rate of occurrence of 4.90 per hour after the earthquake.

Figure 7A:
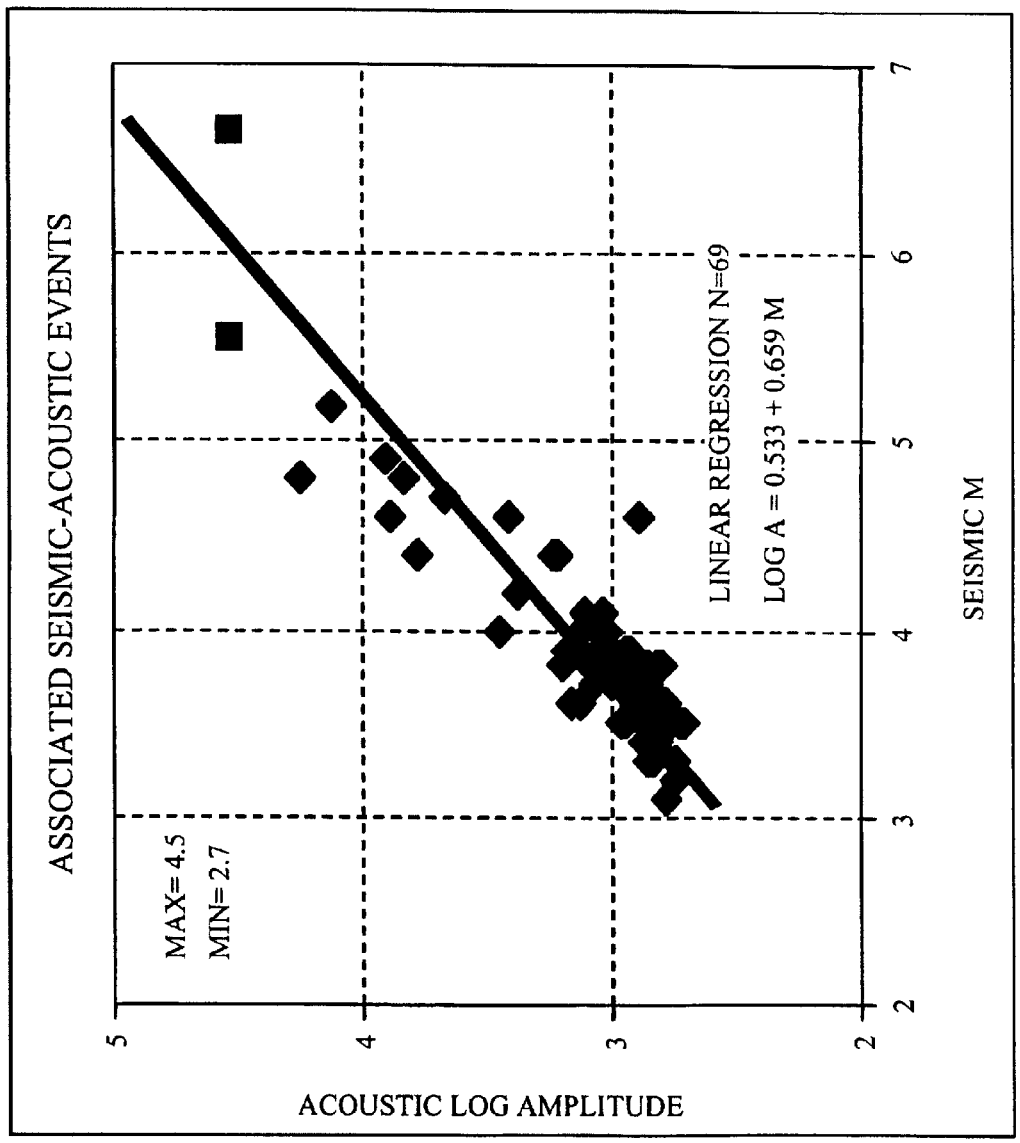
FIG. 7A and FIG. 7B are scatter plots of paired seismic and acoustic events recorded after the 1994 Northridge earthquake.
Figure 7B:
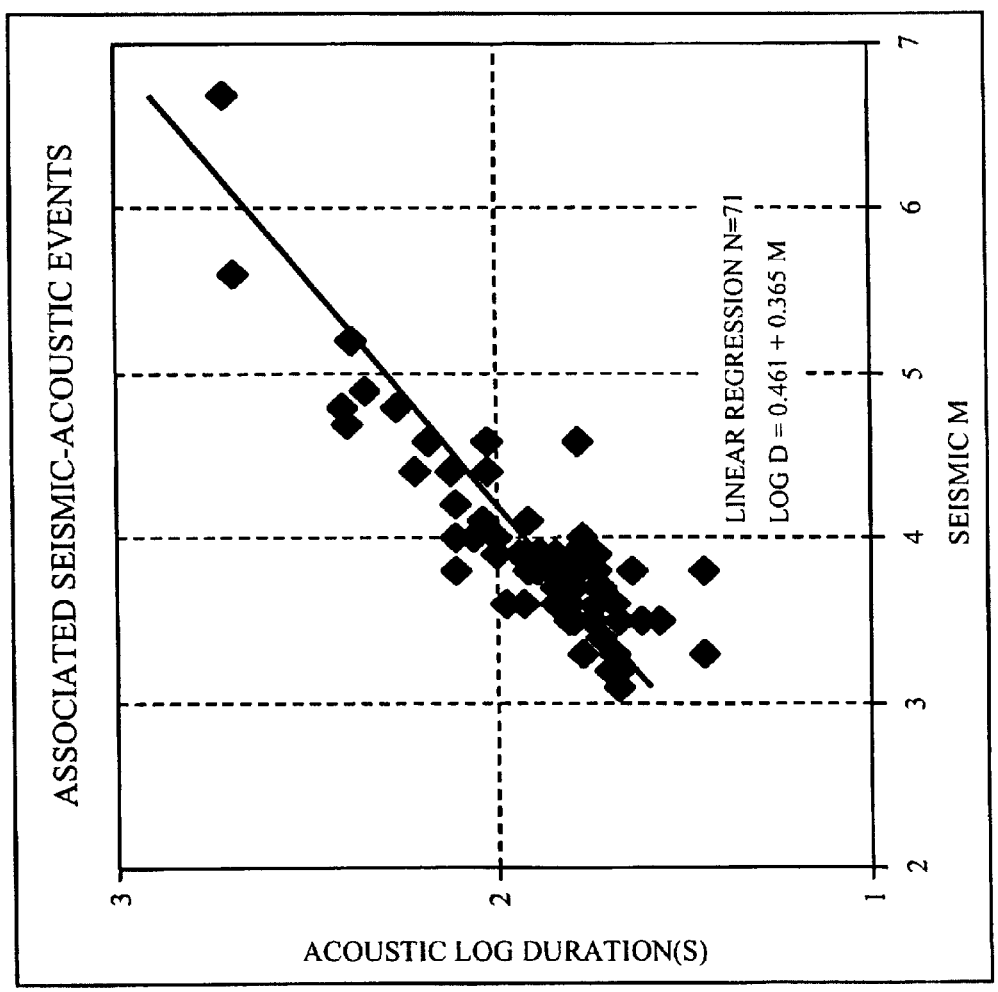

This study found that P-waves correlated with land-based seismic events, while the T-waves did not correlate with the same events. FIG. 7A and FIG. 7B are scatter plots of paired seismic and acoustic events recorded after the 1994 Northridge earthquake. FIG. 7A is a plot of P-wave amplitude and seismic magnitude of event pairs, and FIG. 7B is a plot of P-wave duration and seismic magnitude of the same event pairs. FIG. 7A shows that the log of amplitude of P-waves and the magnitude of seismic events exhibit a linear relationship with a correlation coefficient of C=0.853. A linear least squares fit yields the equation log A=0.533+ 0.659M, where A is the acoustic amplitude in digital units and M is the seismic magnitude in log units. FIG. 7B shows that the duration of P-waves in seconds was also found to be highly correlated to seismic events with a correlation coefficient of C=0.870. The linear least squares equation for duration D was determined to be log D=0.461+0.365M. Thus, the above equations can be used to estimate seismic magnitude based on acoustic wave amplitude and/or duration. Using these equations, the energy (E) of acoustic events in ergs can be estimated from acoustic event duration in seconds as Log E=4.1 Log D+9.5.

The rebound theory states that earthquakes result from the sudden release of energy stored as elastic strain in tectonic plates. The similarity principle assumes a constant relationship of stress drop to event magnitude in earthquakes. While this principle may not hold true for diverse geologic regions, it likely holds true for specific environments. Therefore, it is assumed possible to estimate impending earthquake magnitude from analysis of seismic acoustic activity of a specific environment.

Clearly, many modifications and variations of the method of using ocean acoustic sensors for coastal earthquake prediction are possible in light of the above teachings. It is therefore to be understood that within the scope of the appended claims, the method of using ocean acoustic sensors for coastal earthquake prediction may be practiced otherwise than as specifically described.

The invention claimed is:

1. A method of predicting impending seismic activity comprising the steps of:
   locating at least one acoustic sensor in a body of water;
   sensing acoustic events, including primary and tertiary waves, using said acoustic sensor;
   recording at least one characteristic of said acoustic events;
   predicting based on said recorded characteristic the occurrence of said impending seismic activity.

2. The method of claim 1 wherein said characteristics include frequency, amplitude, and duration of said acoustic events.

3. The method of claim 2 further comprising the steps of:
   producing a signal representing the occurrence of acoustic events with frequencies under 100 hertz over a selected time period;
   determining the rate of occurrence of said acoustic events with frequencies under 100 hertz over said selected time period.

4. The method of claim 3 wherein:

a decrease in the rate of occurrence of acoustic events with frequencies under 100 hertz during a portion of said selected time period is a prediction of impending seismic activity.

5. The method of claim 2 further comprising the steps of:

producing a signal representing the occurrence of tertiary waves over a selected time period; and determining the rate of occurrence of tertiary waves over said selected time period.

6. The method of claim 5 wherein:

a decrease in the rate of occurrence of tertiary waves during a portion of said selected time period is a prediction of impending seismic activity.

\* \* \* \* \*